March 3, 1931.  P. VOGLSAMER  1,794,995

LIQUID MEASURING DEVICE

Filed Oct. 31, 1927  2 Sheets-Sheet 1

Inventor:
Peter Voglsamer
Attorney

March 3, 1931.   P. VOGLSAMER   1,794,995
LIQUID MEASURING DEVICE
Filed Oct. 31, 1927   2 Sheets-Sheet 2
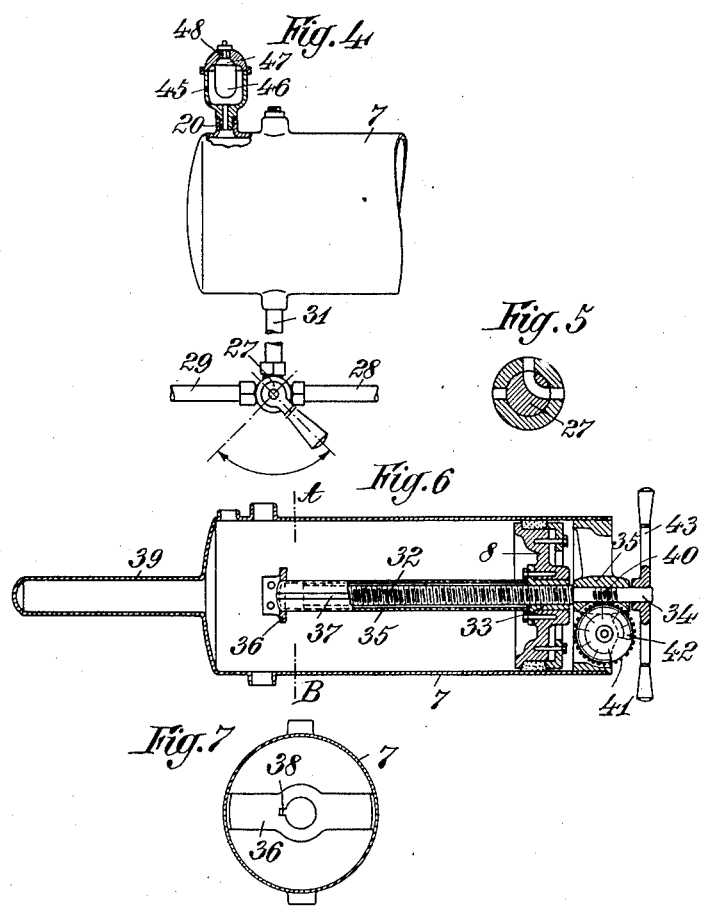
Inventor:
Peter Voglsamer
By
Attorney.

Patented Mar. 3, 1931

1,794,995

UNITED STATES PATENT OFFICE

PETER VOGLSAMER, OF MUNICH, GERMANY

LIQUID-MEASURING DEVICE

Application filed October 31, 1927, Serial No. 230,031, and in Germany February 1, 1927.

This invention relates to a method of mixing concrete and mortar, as well as to a device for carrying this method into practice. The mixing of concrete and mortar by means of cement-concrete and mortar mixing machines has been practiced up to now in this manner that to a definite filling of the mixing machine water is admixed from a receptacle by means of a hose or a pipe, the amount of the water being determined at will by the attendant with the aid of an adjustable cock. It is left to the attendant to open the cock more or less according to his estimation of the degree of moisture of the mass, or according to his observation and opinion as to the proper amount of water in order to attain the proper proportion of mixture. It is evident at once that this procedure is very primitive and furthermore, connected with the unavoidable drawback that the mixture is sometimes too wet and sometimes too dry, and that in every case the proportion of mixture is likely not to be the best.

According to the present invention the method is carried through in this way that to a certain definite amount of the concrete or mortar mixture in the machine a definite amount of liquid is added which is determined by a device provided for the purpose according to certain data ascertained experimentally so that after the proper adjustment has been effected the mortar and cement-concrete mixture will always show an equal percentage of liquid. To attain the object in view an adjustable measuring vessel is filled automatically from a source of liquid and emptied also automatically into the mixing machine.

Figure 1:
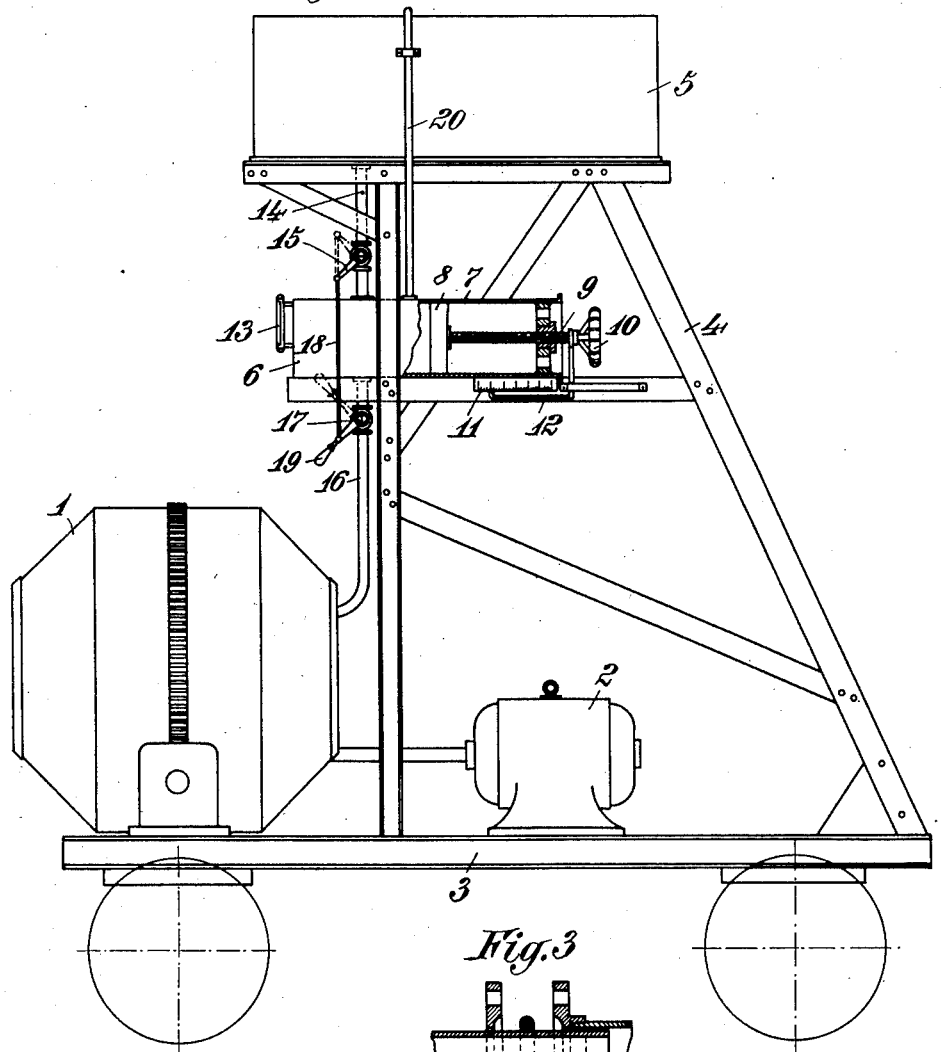
Figure 2:
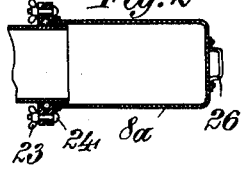
Figure 3:
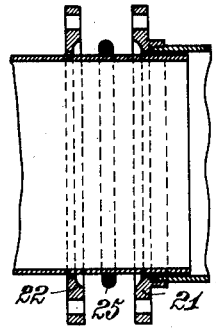

The invention is illustrated diagrammatically and by way of example on the accompanying drawings on which Figure 1 is a side view of a complete mixing plant, comprising the mixing machine, a liquid receptacle, the measuring vessel, and an electromotor, the measuring vessel being shown partly in axial section; Figure 2 is an axial section through portions of a modified constructional form of the measuring vessel; Figure 3 shows some details of this modification drawn to an enlarged scale; Figure 4 shows parts of another modified measuring vessel; Figure 5 is a transverse section through a cock forming a part of this modification; Figure 6 is an axial section through another modified measuring vessel; and Figure 7 shows some details of the same.

On the drawing, 1, Fig. 1, denotes the mixing machine which is of a usual design and requires no detailed description. It is tiltable and rotary, as usual, and driven by an electromotor 2 affixed to a portable frame 3 carrying also the mixing machine. The horizontal frame 3 carries also a vertical frame 4 supporting on its top the liquid receptacle 5 and below the same the measuring vessel 6 which comprises a cylinder 7 and a packed piston 8. The piston is movably connected with a threaded spindle 9, the outer part of which passes through a stationary cylinder bottom and the outer end of which is provided with a hand-wheel 10. The cylinder bottom is provided with a threaded sleeve for the reception of the spindle 9, and the piston 8 can be shifted in the cylinder 7 by means of the hand-wheel 10 in order to vary the capacity of the cylinder-space lefthand from the piston. Instead of the threaded spindle a smooth rod may be connected with the piston and secured in its position, after the adjustment of the piston, by any suitable clamping means. The piston may be formed by a simple disk having a circumferential packing of leather, rubber or the like. A graduated scale 11 attached to one of the members forming the frame 4 co-operates with an angular pointer 12 connected with the spindle 9, these members 11 and 12 indicating the degree of filling of the liquid chamber of the cylinder 6. On the other end of the cylinder is provided a water gauge 13 permitting the level of the liquid to be seen in the cylinder.

The cylinder and the receptacle 5 are connected with each other by a pipe 14 into which a cock or valve 15 is inserted, and a pipe 16 connects the cylinder with the mixing machine 1 and is also provided with a cock or valve 17. Both cocks or valves are connected with each other by a rod 18, by means of which both can be actuated at one time. The lower cock or valve has a grip 19 by which both cocks or valves can be operated. The cocks are so designed that one is open when the other is closed, and vice versa. 20 is a ventilating pipe projecting upwardly from the cylinder 7.

In the modification of the measuring vessel shown in Fig. 2, there is no piston with means for shifting it, but the cylinder is bipartite, and its righthand part is formed by a hood 8ª provided with a grip 26 by which it can be shifted upon the lefthand part so as to vary the capacity of the measuring vessel, or the cylinder respectively. This construction is cheaper than that first described. In order to obtain a particularly large variableness of the cylinder-capacity also the other end of the same may be provided with such a hood, the vessel being then threepartite. The shiftable part is provided with a fixed flange 21, and a loose flange 22 is located upon the stationary part of the measuring cylinder and a rubber ring may be pressed in between said flanges by means of bolts 24 and winged nuts 23, as in Fig. 2 whereby the joint between the two cylinder parts is tightly packed.

The manner of action is, briefly stated, as follows:

The rod 18 (Fig. 1) is first moved into the position shown in dotted lines in which the upper cock is opened and the lower closed. The measuring vessel, the capacity of which has previously thereto been adjusted, as described, is now filled with water from the receptacle 5. In the meantime a certain predetermined amount of concrete or mortar has been introduced into the mixing machine 1, and now the measured amount of liquid is permitted to flow into the machine 1 in that the grip 19 is depressed into the position shown in the drawing by the full lines, whereby the upper cock is closed and the lower opened. This procedure is repeated at every fresh filling of the mixing machine; and it is obvious that the mixture of the concrete or mortar with water is always the same, the percentage of liquid in the concrete, etc., being, therefore, also always the same, as required. The measuring vessel can be used, of course, not only for water, but also for another liquid or liquid substance, for instance water-glass, oil and the like; in fact, for any liquid or liquid substance, of which a definite amount is to be admixed with a definite amount of another material so as to obtain a mixture of a definite composition.

I wish it to be understood that the receptacle 5 may be dispensed with and the measuring vessel connected up to a water supply pipe of a main or the like. In such a case the measuring vessel 7 is provided with a three-way cock 27, Fig. 4, connected by a pipe 31 with the vessel 7, by a pipe 28 with the water supply pipe, and by a pipe 29 with the mixing machine. In the one position the pipes 28 and 31 are connected with each other, when the vessel 7 will be filled, and in the other position the pipes 31 and 29 are connected with each other when the water will flow from the measuring vessel to the mixing machine.

On the top of the measuring vessel 7 is a branch 20 bearing a valve casing 45 in which a float 46 carrying a valve 47 is enclosed. When the vessel 7 has been completely filled, the water enters also into said casing 45 and lifts the float 46 whereby the valve 47 is, finally, caused to close an air discharge opening 48 provided in the top of the said casing. The further supply of water ceases, of course, at once. When, later on, the measuring vessel is being emptied again, first the level of the water in the casing 45 sinks, but with it the float and the valve, so that now air can flow first into the valve casing and then into the measuring vessel.

While in Fig. 1 the piston 8 is not prevented from turning together with the spindle 9, the turning of the piston is prevented in the modification shown in Figs. 6 and 7, in which the piston is connected with a tube 35 enclosing the threaded spindle 32, the outer portion of which is reduced in diameter and engages with a short worm 40, a worm-wheel 41 forming a part of a counter 42 of any suitable design and adapted to show the degree of filling of the measuring chamber of the cylinder 7. The spindle 32 engages a corresponding thread of the piston and is not axially shiftable, but the piston and the tube 35 can be shifted axially. Turning of these parts is prevented by a longitudinal rib 37 of the tube 35 which engages a recess 38 provided in a transverse member 36 provided in the cylinder 7. The spindle 32 is prevented from axial shifting on the one side by the annular shoulder lefthand from the hub 35 and on the other side by a hand-wheel 43.

I claim:

1. A liquid measuring device for concrete mixing machines comprising a cylinder; a piston in said cylinder having a tube connected therewith; a spindle threaded in the piston and projecting into the tube to vary the capacity of the cylinder by adjustment of the piston by the spindle; and means on the spindle to manually actuate the spindle, said tube also acting to prevent leakage between the piston and spindle.

2. A liquid measuring device for concrete mixing machines comprising a cylinder; a piston in said cylinder having a tube connected therewith; a spindle threaded in the piston and projecting into the tube to vary the capacity of the cylinder by adjustment of the piston by the spindle; and a member in said cylinder for guiding the tube.

3. A liquid measuring device for concrete mixing machines comprising a cylinder; a piston in said cylinder having a tube connected therewith; a spindle threaded in said piston and projecting into the tube to vary the position of the piston in the cylinder to thereby vary the capacity of the cylinder; and an indicating mechanism operated by the spindle to indicate the capacity of the cylinder.

4. A liquid measuring device for concrete mixing machines comprising a cylinder; a piston in said cylinder having a tube connected therewith; a spindle threaded in the piston and projecting into the tube to vary the capacity of the cylinder by adjustment of the piston by the spindle, said tube being provided with a longitudinal rib; and a member in said cylinder having a recess for guiding the tube, said rib projecting in the recess to prevent rotation of the tube and piston.

5. A liquid measuring device for concrete mixing machines comprising a cylinder; a piston in said cylinder having a tube connected therewith; a spindle threaded in the piston and projecting into the tube to vary the capacity of the cylinder by adjustment of the piston by the spindle, said tube being provided with a longitudinal rib; a member in said cylinder having a recess for guiding the tube, said rib projecting in the recess to prevent rotation of the tube and piston; and an extension tube on the end of the cylinder into which the tube on the piston may be projected.

In testimony whereof, I have affixed my signature.

PETER VOGLSAMER.